(12) United States Patent
Chang et al.

(10) Patent No.: US 10,842,225 B2
(45) Date of Patent: Nov. 24, 2020

(54) ARTICLE INCLUDING A BLADDER ELEMENT WITH AN IMAGE AND METHOD OF MANUFACTURING THE ARTICLE

(71) Applicant: NIKE, Inc., Beaverton, OR (US)

(72) Inventors: Yihua Chang, Portland, OR (US); Taryn Hensley, Beaverton, OR (US); Dervin A. James, Hillsboro, OR (US); Danielle L. Taylor, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 495 days.

(21) Appl. No.: 15/093,066

(22) Filed: Apr. 7, 2016

(65) Prior Publication Data

US 2016/0295963 A1    Oct. 13, 2016

Related U.S. Application Data

(60) Provisional application No. 62/144,548, filed on Apr. 8, 2015.

(51) Int. Cl.
  *A43B 13/20*  (2006.01)
  *A43B 1/00*   (2006.01)
  (Continued)

(52) U.S. Cl.
  CPC ............ *A43B 13/20* (2013.01); *A43B 1/0072* (2013.01); *A43B 3/0078* (2013.01); *A43B 13/12* (2013.01);
  (Continued)

(58) Field of Classification Search
  CPC ..... A43B 3/0078; A43B 1/0072; A43B 13/20; A43B 13/203; A43B 13/12; A43B 23/24;
  (Continued)

(56) References Cited

U.S. PATENT DOCUMENTS 2,151,314 A   10/1935   Burger
3,591,402 A    7/1971   Blackfan
(Continued)

FOREIGN PATENT DOCUMENTS

CA    1111222 A    10/1981
CN    2183195 Y    11/1994
(Continued)

OTHER PUBLICATIONS

American Society for Testing and Materials (ASTM) Standard D1003-00, Standard Test Method for Haze and Luminous Transmittance of Transparent Plastics, Jul. 2000, Book of Standards vol. 08.01, ASTM International, Pennsylvania, USA.
(Continued)

*Primary Examiner* — Nathan E Durham
*Assistant Examiner* — Abby M Spatz
(74) *Attorney, Agent, or Firm* — Quinn IP Law (57) ABSTRACT

A method of manufacturing an article includes applying a colored medium on a first polymeric sheet to establish an image on the first polymeric sheet. The method further comprises forming a fluid-filled bladder element at least partially from the first polymeric sheet, and assembling the fluid-filled bladder element in the article so that a first portion of the fluid-filled bladder element having the image is exposed to view, and a second portion of the fluid-filled bladder element is blocked from view by the article. An article comprises a fluid-filled bladder element at least partially formed from a first polymeric sheet, and a colored medium establishing an image on the first polymeric sheet. A first portion of the fluid-filled bladder element having the image is exposed to view, and a second portion of the fluid-filled bladder element is blocked from view by the article.

19 Claims, 6 Drawing Sheets

(51) Int. Cl.
  *A43B 3/00* (2006.01)
  *B29D 35/14* (2010.01)
  *B29D 35/12* (2010.01)
  *A43B 23/24* (2006.01)
  *A43B 13/12* (2006.01)
  *G09F 23/00* (2006.01)
  *B29K 75/00* (2006.01)

(52) U.S. Cl.
  CPC ............ *A43B 13/203* (2013.01); *A43B 23/24* (2013.01); *B29D 35/122* (2013.01); *B29D 35/128* (2013.01); *B29D 35/142* (2013.01); *B29D 35/148* (2013.01); *B29K 2075/00* (2013.01); *G09F 23/00* (2013.01)

(58) Field of Classification Search
  CPC ........ A63H 3/06; A63B 41/02; B29D 35/148; B29D 35/122; B29D 35/128; B29D 35/142
  USPC ........................................................ 264/132
  See application file for complete search history.

(56) References Cited

U.S. PATENT DOCUMENTS

| | | | |
|---|---|---|---|
| 4,183,156 A | 1/1980 | Rudy | |
| 4,219,945 A | 9/1980 | Rudy | |
| 4,571,853 A | 2/1986 | Medrano | |
| 4,936,029 A | 6/1990 | Rudy | |
| 5,042,176 A | 8/1991 | Rudy | |
| 5,083,361 A | 1/1992 | Rudy | |
| 5,092,060 A | 3/1992 | Frachey et al. | |
| 5,393,372 A | 2/1995 | Ammon | |
| 5,572,804 A * | 11/1996 | Skaja | A43B 13/181 36/28 |
| 5,575,088 A | 11/1996 | Allen et al. | |
| 5,580,410 A | 12/1996 | Johnston | |
| 5,713,141 A | 2/1998 | Mitchell et al. | |
| 5,735,776 A | 4/1998 | Swezey et al. | |
| 5,802,739 A | 9/1998 | Potter et al. | |
| 5,815,950 A | 10/1998 | Wang | |
| 5,885,515 A | 3/1999 | Hudkins | |
| 5,952,065 A | 9/1999 | Mitchell et al. | |
| 5,968,657 A * | 10/1999 | Scullin | B29C 37/0025 428/423.1 |
| 6,009,637 A | 1/2000 | Pavone | |
| 6,013,340 A | 1/2000 | Bonk et al. | |
| 6,031,019 A * | 2/2000 | Tsutsumi | C08F 283/12 523/160 |
| 6,060,144 A | 5/2000 | Kimura et al. | |
| 6,082,025 A * | 7/2000 | Bonk | A43B 1/0045 36/28 |
| 6,099,789 A | 8/2000 | Sumi | |
| 6,127,026 A | 10/2000 | Bonk et al. | |
| 6,129,799 A | 10/2000 | McGraw | |
| 6,164,729 A * | 12/2000 | Dibenedetto | A63C 17/223 152/165 |
| 6,203,868 B1 | 3/2001 | Bonk et al. | |
| 6,299,962 B1 | 10/2001 | Davis et al. | |
| 6,303,198 B1 | 10/2001 | Chen | |
| 6,321,465 B1 | 11/2001 | Bonk et al. | |
| 6,361,840 B2 | 3/2002 | Nelson et al. | |
| 6,402,879 B1 | 6/2002 | Tawney et al. | |
| 6,451,417 B1 | 9/2002 | Sumi et al. | |
| 6,544,634 B1 | 4/2003 | Abrams et al. | |
| 6,547,703 B1 | 4/2003 | Swezey et al. | |
| 6,571,490 B2 | 6/2003 | Tawney et al. | |
| 6,632,858 B1 | 10/2003 | Pears et al. | |
| 6,790,391 B2 | 9/2004 | Watkins | |
| 6,944,973 B2 | 9/2005 | Goodwin | |
| 6,998,005 B2 | 2/2006 | Magee et al. | |
| 7,073,276 B2 | 7/2006 | Swigart | |
| 7,131,218 B2 | 11/2006 | Schindler | |
| 7,152,343 B2 | 12/2006 | Whatley | |
| 7,178,267 B2 | 2/2007 | Skaja et al. | |
| 7,401,369 B2 | 7/2008 | White et al. | |
| 7,449,087 B2 | 11/2008 | Odajima et al. | |
| 7,622,014 B2 | 11/2009 | Millette et al. | |
| 7,622,066 B2 | 11/2009 | Brustad et al. | |
| 7,917,981 B1 | 4/2011 | Lakic | |
| 8,574,387 B2 | 11/2013 | Hull et al. | |
| 8,813,389 B2 | 8/2014 | Gishifu et al. | |
| 8,850,719 B2 | 10/2014 | Hawkinson et al. | |
| 9,198,477 B2 | 12/2015 | Davis et al. | |
| 2002/0050077 A1* | 5/2002 | Wang | A43B 5/00 36/28 |
| 2003/0151168 A1 | 8/2003 | Gohl et al. | |
| 2004/0045192 A1 | 3/2004 | Lin | |
| 2004/0071936 A1 | 4/2004 | Martelli | |
| 2005/0023185 A1 | 2/2005 | Ramet | |
| 2006/0017200 A1 | 1/2006 | Cundiff et al. | |
| 2007/0000605 A1 | 1/2007 | Millette et al. | |
| 2007/0294832 A1 | 12/2007 | Shiao | |
| 2008/0110047 A1 | 5/2008 | White et al. | |
| 2008/0261016 A1 | 10/2008 | Tamada et al. | |
| 2009/0013557 A1* | 1/2009 | Rudy | A43B 13/206 36/29 |
| 2009/0045542 A1 | 2/2009 | Borchert et al. | |
| 2009/0045547 A1* | 2/2009 | Schindler | A43B 13/20 264/241 |
| 2011/0005101 A1 | 1/2011 | Sills | |
| 2011/0067263 A1 | 3/2011 | Wyszynski et al. | |
| 2011/0197470 A1 | 8/2011 | Caron et al. | |
| 2011/0271552 A1* | 11/2011 | Peyton | A43B 13/20 36/29 |
| 2011/0277352 A1 | 11/2011 | Diepenbrock et al. | |
| 2012/0055044 A1* | 3/2012 | Dojan | A43B 1/0027 36/87 |
| 2012/0084999 A1* | 4/2012 | Davis | A43B 23/029 36/93 |
| 2013/0055595 A1 | 3/2013 | Brown | |
| 2013/0068378 A1 | 3/2013 | Dua et al. | |
| 2013/0191969 A1* | 8/2013 | Goloveyko | A43B 3/0078 2/245 |
| 2014/0202033 A1 | 7/2014 | Connell et al. | |
| 2014/0259749 A1 | 9/2014 | Taylor et al. | |
| 2015/0351499 A1 | 12/2015 | James | |
| 2016/0295964 A1 | 10/2016 | Hensley et al. | |
| 2016/0295965 A1 | 10/2016 | Hensley et al. | |
| 2016/0295966 A1 | 10/2016 | Hensley et al. | |

FOREIGN PATENT DOCUMENTS

| | | |
|---|---|---|
| CN | 2891731 Y | 4/2007 |
| CN | 101163421 A | 4/2008 |
| CN | 101863394 A | 10/2010 |
| CN | 102085026 A | 6/2011 |
| DE | 243211 A1 | 2/1987 |
| DE | 4038077 A1 | 6/1992 |
| GB | 1215135 A | 12/1970 |
| GB | 1265142 A | 3/1972 |
| GB | 1308776 A | 3/1973 |
| GB | 2330551 A | 4/1999 |
| GB | 2381492 A | 5/2003 |
| JP | S57174215 A | 10/1982 |
| JP | S57178724 A | 11/1982 |
| JP | S57185120 A | 11/1982 |
| JP | S6116830 A | 1/1986 |
| JP | S61146508 A | 7/1986 |
| JP | S6232023 A | 2/1987 |
| JP | S62280022 A | 12/1987 |
| JP | S631521 A | 1/1988 |
| JP | S6354230 A | 3/1988 |
| JP | S63212528 A | 9/1988 |
| JP | S63249615 A | 10/1988 |
| JP | S63252718 A | 10/1988 |
| JP | S6434719 A | 2/1989 |
| JP | H0218025 A | 1/1990 |
| JP | H0218026 A | 1/1990 |
| JP | H0263717 A | 3/1990 |
| JP | H04187418 A | 7/1992 |
| JP | H04331127 A | 11/1992 |

(56) References Cited

FOREIGN PATENT DOCUMENTS

| | | |
|---|---|---|
| JP | H08294957 A | 11/1996 |
| JP | H08323849 A | 12/1996 |
| JP | H0911324 A | 1/1997 |
| JP | H0939078 A | 2/1997 |
| JP | H0948063 A | 2/1997 |
| JP | H0957826 A | 3/1997 |
| JP | H10156927 A | 6/1998 |
| JP | H10217320 A | 8/1998 |
| JP | 2003145612 A | 5/2003 |
| JP | 2004009304 A | 1/2004 |
| JP | 2004291647 A | 10/2004 |
| JP | 2005103965 A | 4/2005 |
| JP | 2005280250 A | 10/2005 |
| JP | 2006015760 A | 1/2006 |
| JP | 2008109501 A | 5/2008 |
| KR | 20010069916 A | 7/2001 |
| RU | 2004447 C1 | 12/1993 |
| WO | 9312685 A1 | 7/1993 |
| WO | 2010039826 A2 | 4/2010 |

OTHER PUBLICATIONS

Nike Air Max 2015, Nov. 19, 2014; https://web.archive.org/web/20141119223217/http://news.nike.com/news/nike-air-max-2015-soft-cushioning-dynamic-fit-and-bold-design [retrieved on Jul. 20, 2016].

\* cited by examiner

ARTICLE INCLUDING A BLADDER ELEMENT WITH AN IMAGE AND METHOD OF MANUFACTURING THE ARTICLE

CROSS-REFERENCE TO RELATED APPLICATION

This application claims the benefit of U.S. Provisional Application No. 62/144,548 filed Apr. 8, 2015, which is hereby incorporated by reference in its entirety.

TECHNICAL FIELD

The present teachings generally include an article that comprises a polymeric sheet for forming a bladder element and has a colored medium applied to establish an image, and a method of manufacturing the article.

BACKGROUND

Clothing, an accessory, and/or athletic wear are often a source of expression for the wearer. The clothing, accessory, and/or athletic wear may provide an association with a team, coordinate with another item, or provide the owner or user with an attractive or customized item.

Footwear typically includes a sole configured to be located under a wearer's foot to space the foot away from the ground or floor surface. Footwear sometimes utilizes polyurethane foam or other resilient materials in the sole to provide cushioning. A fluid-filled bladder element is sometimes included in the sole to provide desired cushioning.

DESCRIPTION

A method of manufacturing an article includes applying a colored medium on a first polymeric sheet that establishes an image on the first polymeric sheet. The method further comprises forming a fluid-filled bladder element at least partially from the first polymeric sheet, and assembling the fluid-filled bladder element in the article so that a first portion of the fluid-filled bladder element having the image is exposed to view, and a second portion of the fluid-filled bladder element is blocked from view by the article.

In one embodiment, the colored medium comprises ink, and applying the colored medium comprises printing the colored medium on the first polymeric sheet. For example, the ink may comprise at least one of an isocyanate group, an isocyanate-reactive group, a weak polar or non-polar solvent, a weak polar or non-polar diluent, an alcohol-soluble ink, a polyamide ink, a dye-containing ink, an acrylic ink, or a water-based ink. The colored medium may include reflective particles.

Non-limiting examples of printing the colored medium comprise pad printing, sublimation printing, flexographic printing, direct rotary printing, lithographic printing, gravure printing, or digital printing. In an alternative embodiment, or in addition to applying the colored medium by printing, applying the colored medium comprises painting the colored medium on the first polymeric sheet.

The method may further comprise forming the first polymeric sheet with a curved portion, wherein the image is on the curved portion. In other words, when the first polymeric sheet at least partially forms the fluid-filled bladder element, the fluid-filled bladder element is formed with a curved portion.

The method may further comprise bonding the first polymeric sheet to a second polymeric sheet at a peripheral seam so that the first polymeric sheet and the second polymeric sheet together define an internal cavity sealed by the peripheral seam. The image is spaced from the peripheral seam. Additionally, forming the bladder element may comprise thermoforming, and bonding the first polymeric sheet to the second polymeric sheet may comprise compressing the first polymeric sheet to the second polymeric sheet at the peripheral seam during thermoforming. Alternatively or in addition, bonding the first polymeric sheet to the second polymeric sheet may comprise radio frequency welding the first polymeric sheet to the second polymeric sheet at the peripheral seam. The fluid-filled bladder element may have an internal cavity that is filled with gas at or above ambient pressure.

After the fluid-filled bladder element is formed, the method may include assembling the fluid-filled bladder element in the article so that the image is exposed to view and the peripheral seam is covered by the article and blocked from view by the article. The article may have an opening, and the image may be aligned with the opening, and exposed to view through the opening.

For example, the article may be an article of footwear having a sole assembly and an upper, with the opening in one of the sole assembly and the upper. Assembling the fluid-filled bladder element in the article may comprise securing the fluid-filled bladder element to the sole assembly so that the image is aligned with the opening and exposed to view through the opening. For example, the opening may be in a midsole or an outsole of the sole assembly. In an embodiment, the method may comprise securing an outsole, at least one portion of which is substantially transparent, to the fluid-filled bladder element so that the at least one portion of the outsole that is substantially transparent is aligned with the image, and the image is exposed to view through the at least one portion of the outsole that is substantially transparent.

The method may include any of various steps to protect the integrity and colorfastness of the image. For example, the method may comprise applying a coating layer over the image. Additionally, the first polymeric sheet may have a releasable film attached thereto prior to forming the bladder element. The releasable film is in contact with a mold surface when the first polymeric sheet is placed in a mold assembly, and the method may further comprise removing the releasable film from the first polymeric sheet after the bladder element is formed in the mold assembly.

The method may further comprise treating the first polymeric sheet to thereby establish a first surface tension of the first polymeric sheet. The colored medium is selected so that it has a second surface tension within 10 percent of the first surface tension. The substantially similar surface tensions of the first polymeric sheet and the colored medium increase the propensity for adherence of the colored medium to the first polymeric sheet and reduce the potential for cracking of the colored medium, especially when the colored medium is on a curved portion of the formed first polymeric sheet. Furthermore, the colored medium can be more flexible than the first polymeric sheet, enabling an equal or greater amount of strain of the colored medium than the first polymeric sheet under load without cracking of the colored medium. Additionally, the first polymeric sheet may have a first hardness, and the method may include selecting the colored medium so that an end hardness of the colored medium is within 25 percent of the first hardness.

The polymeric material of the first polymeric sheet and/or the second polymeric sheet used to form the fluid-filled bladder element may be a variety of materials. For example, the polymeric material may comprise a thermoplastic polymeric material. In one embodiment, the thermoplastic polymeric material may be a thermoplastic polyurethane (TPU). In one embodiment, the TPU is present on at least an outer surface of the first polymeric sheet. The first polymeric sheet may comprise a multi-layer polymeric sheet. The multi-layer polymeric sheet may be a laminate membrane that comprises at least a first layer comprising the TPU, and at least a second layer comprising a gas barrier polymer. The gas barrier polymer may comprise an ethylene-vinyl alcohol copolymer. In one embodiment, the at least a first layer consists essentially of the TPU, and the at least a second layer consists essentially of the ethylene-vinyl alcohol copolymer.

An article comprises a fluid-filled bladder element at least partially formed from a first polymeric sheet, and a colored medium establishing an image on the first polymeric sheet. A first portion of the fluid-filled bladder element having the image is exposed to view, and a second portion of the fluid-filled bladder element is blocked from view by the article.

In various embodiments, the colored medium may comprise paint or ink, and may include reflective particles. For example, the ink may comprise at least one of an isocyanate group, an isocyanate-reactive group, a weak polar or non-polar solvent, a weak polar or non-polar diluent, an alcohol-soluble ink, a polyamide ink, a dye-containing ink, an acrylic ink, or a water-based ink. The polymeric material of the first polymeric sheet may be as described with respect to the method.

The fluid-filled bladder element may have an internal cavity that is filled with gas at or above ambient pressure. The fluid-filled bladder element may also include a second polymeric sheet bonded to the first polymeric sheet at a peripheral seam so that the first polymeric sheet and the second polymeric sheet together define the internal cavity sealed at the peripheral seam, with the peripheral seam covered by the article.

In an embodiment, the article may have an opening, and the fluid-filled bladder element may be secured to the article so that the image is aligned with the opening and exposed to view through the opening.

In an embodiment, the article may be an article of footwear that includes a sole assembly and an upper, one of which has an opening, and the fluid-filled bladder element may be secured to the sole assembly so that the image is aligned with the opening and exposed to view through the opening. For example, the opening may be in a midsole or an outsole of the sole assembly.

In an embodiment, the article may be an article of footwear that includes an outsole at least one portion of which is substantially transparent. The outsole may be secured to the fluid-filled bladder element so that the at least one portion of the outsole that is substantially transparent is aligned with the image and the image is viewable through the at least one portion of the outsole that is substantially transparent.

The article may include a coating layer applied over the image. Additionally, the first polymeric sheet may have a releasable film attached thereto. The first polymeric sheet may have a first surface tension. The colored medium may have a second surface tension within 10 percent of the first surface tension. Additionally, the first polymeric sheet may have a first hardness, and the colored medium may have an end hardness within 25 percent of the first hardness.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Figure 1:
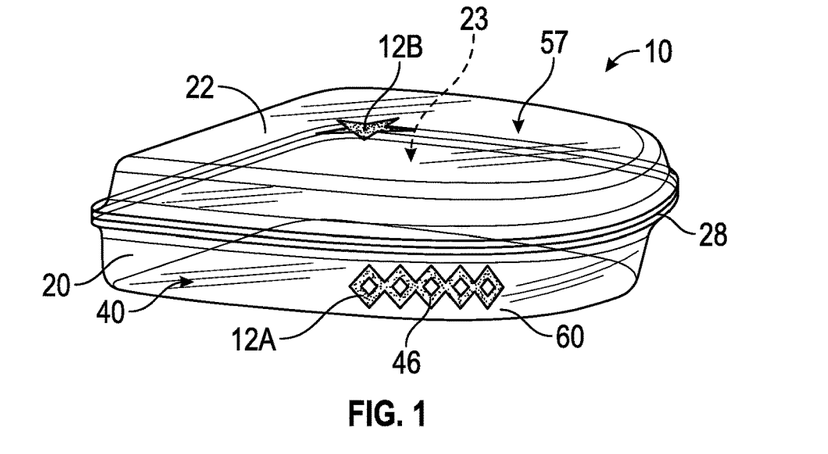
FIG. 1 is a schematic illustration in perspective view of a first embodiment of a bladder element having colored medium applied thereon to establish images.
Figure 2:
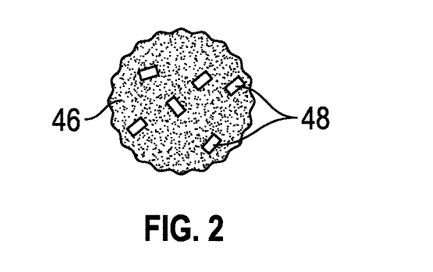
FIG. 2 is a schematic illustration in fragmentary view of a portion of one of the images of FIG. 1.

Referring to the drawings, wherein like reference numbers refer to like components throughout the several views, FIG. 1 shows a fluid-filled bladder element 10 that has an image 12A applied thereon with a colored medium 46. At least a portion of the fluid-filled bladder element 10 is substantially transparent, and the image 12A can be viewed from an exterior of the fluid-filled bladder element 10 when the fluid-filled bladder element is assembled in an article, such as the article of footwear 18 of FIG. 5. In the embodiment shown, the entire bladder element 10 to which the image 12A is applied is substantially transparent. The colored medium 46 can be ink or paint, and may include reflective particles 48, shown in the close-up view of FIG. 2. Optionally, additional images 12B and 12C, shown in FIG. 3, can be applied with a similar or different colored medium 46 or can be applied in a different manner. As further explained herein, the colored medium 46 and the first and second polymeric sheets 20, 22 used to form the bladder element 10 may be treated or processed, and/or have properties specifically selected to enable the images 12A, 12B, and 12C to be lasting and aesthetically pleasing.

As used herein, a "fluid" includes a gas, including air, an inert gas such as nitrogen, or another gas. Accordingly, "fluid-filled" includes "gas-filled". As used herein, a component is "substantially transparent" if it has a luminous transmittance (i.e., a percentage of incident light that is transmitted) of at least 80 percent and haze (i.e., percentage of transmitted light that is scattered) of not more than 56 percent. The various materials used for the bladder element 10, and other embodiments of bladder elements discussed herein, may be substantially transparent. Those skilled in the art will readily understand a variety of methods to determine luminous transmittance and haze of an object, such as the bladder element 10. For example, the luminous transmittance and haze of the bladder element 10 can be determined according to American Society for Testing and Materials (ASTM) Standard D1003-00, Standard Test Method for Haze and Luminous Transmittance of Transparent Plastics. Additionally, in some embodiments, the bladder element 10 may have a tinted color.

Figure 5:
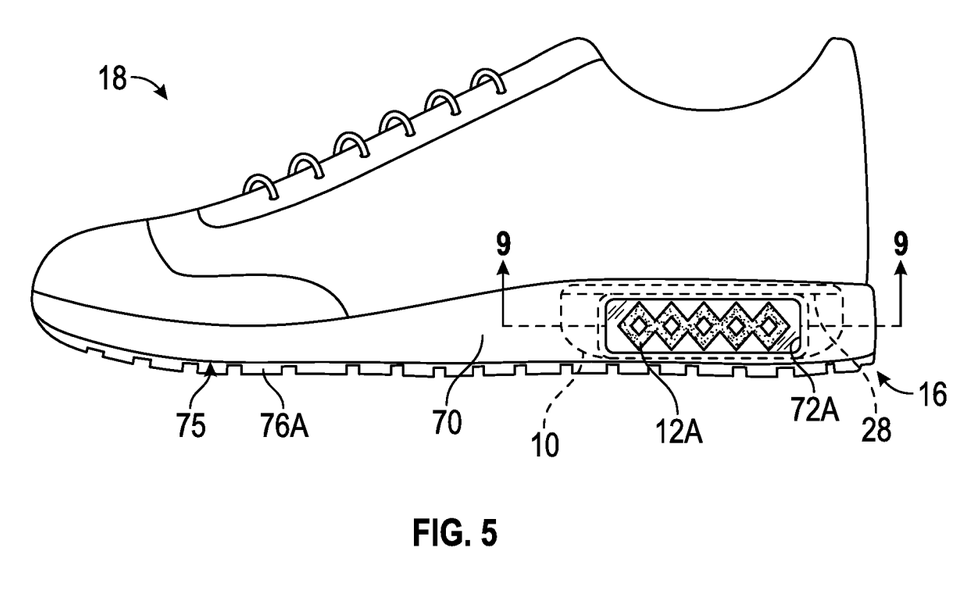
FIG. 5 is a schematic side view illustration of an article of footwear having a sole assembly with the bladder element of FIG. 1 secured to the sole assembly.

The bladder element 10 with images 12A, 12B, 12C are included in a sole assembly 16 of an article of footwear 18. As shown in FIG. 5, the article of footwear 18 is an athletic shoe, and the bladder element 10 is a cushioning element. In other embodiments, the sole assembly 16 could be for an article of footwear that is a dress shoe, a work shoe, a sandal, a slipper, a boot, or any other category of footwear. Alternatively, the fluid-filled bladder element 10 could be used as a cushioning element in another article, such as but not limited to a shoulder strap, a backpack, a shoulder pad, a glove, an elbow pad, a knee pad, a shin guard, or other apparel, or a sports ball.

As shown in FIG. 1, the bladder element 10 is formed from a first polymeric sheet 20, and a second polymeric sheet 22 secured to one another to define an internal fluid-filled cavity 23 that sealingly retains a fluid such as gas, as described herein. A second image 12B is applied to the top surface 57 of the second polymeric sheet 22. In the embodiment shown, the second image is a star shape. The second image 12B can be of the same or a different colored medium as described with respect to image 12A.

Figure 3:
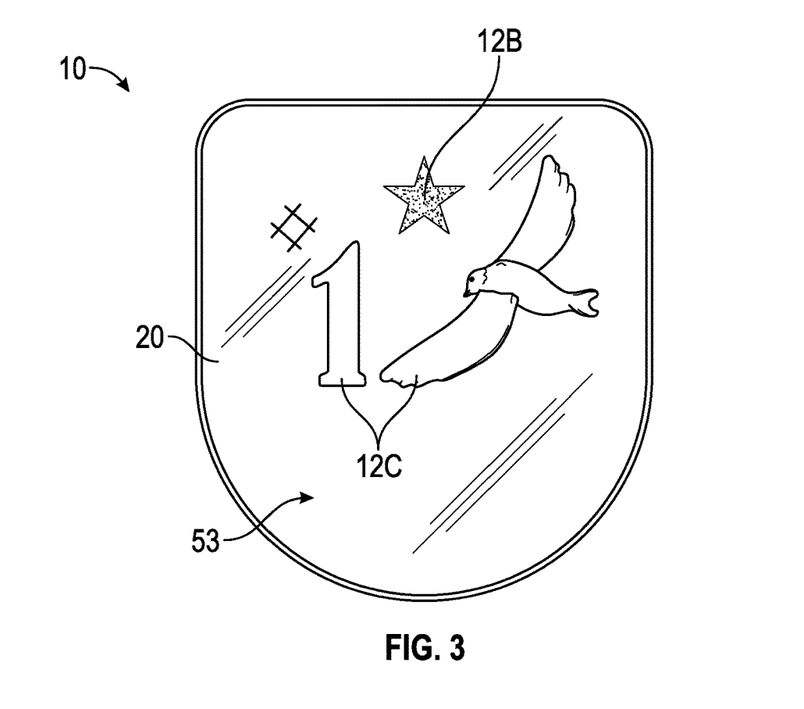
FIG. 3 is a schematic illustration in bottom view of the bladder element of FIG. 1 showing another image.
Figure 4:
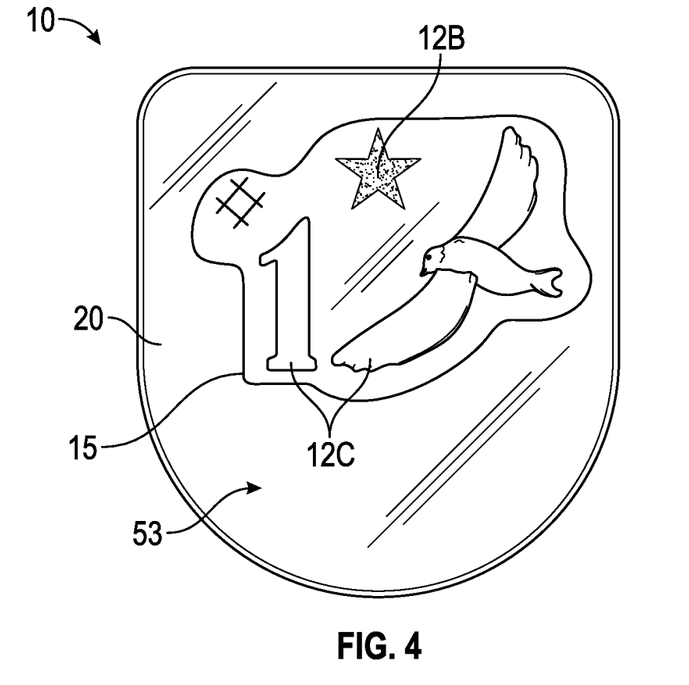
FIG. 4 is a schematic illustration in bottom view of the bladder element of FIG. 1 with a coating applied.

The third image 12C is applied to the first polymeric sheet 20. In the embodiment shown, the third image 12C includes a number and a pictorial representation of a bird. For example, the third image 12C may be a player number and a team logo. The third image 12C can be of the same or a different colored medium as described with respect to image 12A. As shown in FIGS. 3 and 4, although the second image 12B is on the second polymeric sheet 22, the second image 12B can be viewed from an exterior of the bladder element 10 through the first polymeric sheet 20. In another embodiment, the bladder element may be formed from a single polymeric sheet.

In the embodiment shown, the images 12A, 12B, 12C are on not more than one quarter of the outer surface 40 of the bladder element 10. The total printed area of the images 12A, 12B, 12C is not more than one quarter of the area of the outer surface 40 of the bladder element 10. The printed area of each image 12A and 12C is not more than one quarter of the surface area of the outer surface of the first polymeric sheet 20. The printed area of image 12B is not more than one quarter of the surface area of the outer surface of the second polymeric sheet 22.

Figure 9:
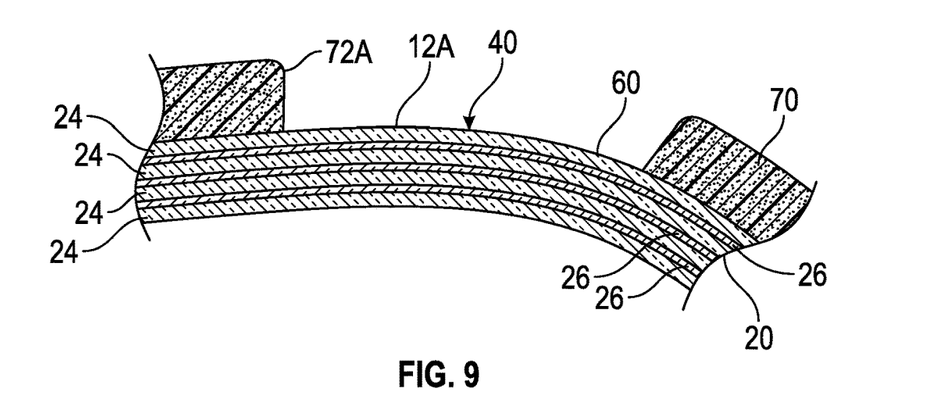
FIG. 9 is a schematic illustration in fragmentary cross-sectional view of the article of footwear of FIG. 5 taken at lines 9-9 in FIG. 5.
Figure 10:
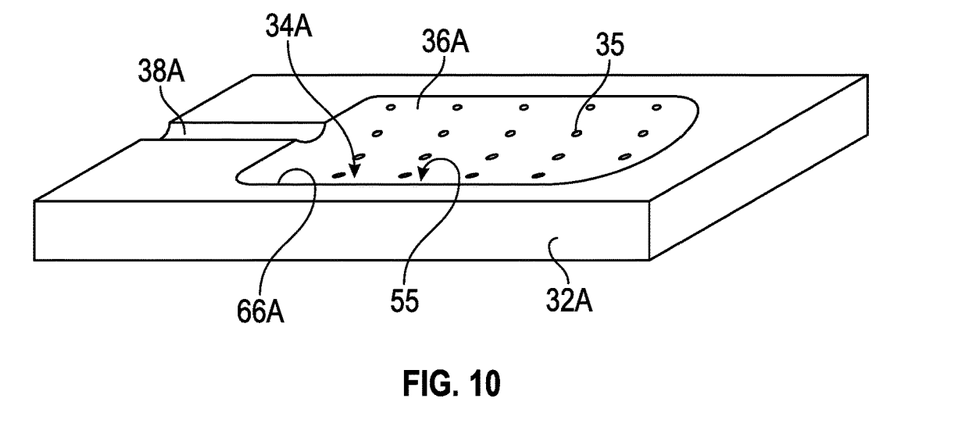
FIG. 10 is a schematic perspective illustration of a first mold half of a mold assembly for the bladder element of FIG. 1.

The fluid-filled bladder element 10 can be formed from a variety of polymeric materials. In an embodiment shown and described at least with respect to FIGS. 1-3, the bladder element 10 can be formed from any of various polymeric materials that can retain a fluid at a predetermined pressure, including a fluid that is a gas, such as air, nitrogen, or another gas. For example, the bladder element 10 can be thermoplastic polymeric material. The bladder element 10 can be a urethane, polyurethane, polyester, polyester polyurethane, and/or polyether polyurethane. Moreover, the bladder element 10 can be formed of layers of different materials. FIG. 9, which is a close-up fragmentary cross-sectional portion of the bladder element 10 in an article of footwear 18 taken at lines 9-9 in FIG. 5, shows that the first polymeric sheet 20 is a laminate membrane formed from thin films having one or more first layers 24 that comprise thermoplastic polyurethane layers 24 and that alternate with one or more second layers 26, also referred to herein as barrier layers, that comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The second polymeric sheet 22 may be formed from the same materials shown and described in FIG. 9 with respect to the first polymeric sheet 20. The first layer 24 may be arranged to form an outer surface of the first polymeric sheet 20. That is, the outermost first layer 24 shown in FIG. 9 may be a portion of the outer surface 40 of the bladder element 10. The bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier material such as second layers 26 and an elastomeric material such as first layers 24, as disclosed in U.S. Pat. Nos. 6,082,025 and 6,127,026 to Bonk et al. which are incorporated by reference in their entireties. Additional suitable materials for the bladder element 10 are disclosed in U.S. Pat. Nos. 4,183,156 and 4,219,945 to Rudy which are incorporated by reference in their entireties. Further suitable materials for the bladder element 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 10, engineering properties such as tensile strength, stretch properties, fatigue characteristics, dynamic modulus, and loss tangent can be considered. The thicknesses of sheets 20, 22 of materials used to form the bladder element 10 can be selected to provide these characteristics. For example, in various embodiments, the bladder element 10 may have a Shore A hardness of about 20 to about 100 when inflated.

Although the bladder element 10 may only have one image, such as image 12A applied to the first polymeric sheet 20, in the embodiment of FIG. 1, the bladder element 10 has multiple images, including additional images 12B, and 12C. As used herein, an "image" may comprise one or more of numbers, letters, pictorial representations, and patterns, and may be created by one or more colored mediums 46 that may have multiple colors, or contrasting textures. The images 12A, 12B, and/or 12C can be printed on the first and/or second polymeric sheets 20, 22 before they are formed into the bladder element 10, or after the first and/or second polymeric sheets 20, 22 are formed into the bladder element 10, whether before or after the bladder element 10 is inflated. As previously mentioned, in an embodiment in which the first and second polymeric sheets 20, 22 are multilayer sheets, the bladder element 10 can be printed or painted on one of the layers 24, 26. This printing or painting may be done before the layers 24, 26 are assembled into the multilayer sheet if the image 12A, 12B, and/or 12C is on an interior layer surface.

In the embodiment shown in FIG. 1, the image 12A is a diamond pattern, and is provided by a colored medium 46 applied to the fluid-filled bladder element 10. As indicated in the close-up view in FIG. 2, the colored medium 46 is an ink as a base and has reflective particles 48. The reflective particles 48 allow for light to be cast back towards its source. The reflective particles 48 may also allow light to be scattered. In such embodiments, this provides a safety feature for low-light or full-light environments. The reflective particles 48 can be metal flakes or may include a phosphorescent material so that the reflective particles are a "glow-in-the-dark" material. In embodiments with reflective particles 48, a curved portion 60 of the inflated bladder element 10, discussed with respect to FIG. 9, facilitates reflecting of the light by the reflective particles 48. For example, during a normal gait, a foot on which the article of footwear 18 is worn is repeatedly lifted and planted. The motion of the normal gait creates an additional "flash" of reflected light from the reflective particles 48 and makes the article of footwear 18 more noticeable.

In an embodiment in which the colored medium 46 is an ink, applying the colored medium 46 to the bladder element 10 may be by printing the ink on the first polymeric sheet 20 to establish the first image 12A and the third image 12C, and printing the ink on the second polymeric sheet 22 to establish the second image 12B. Exemplary printing techniques include direct and indirect printing techniques. Those include, but are not limited to, sublimation printing, flexographic printing, direct rotary printing, lithographic printing, gravure printing, pad printing, digital printing, and combinations thereof. The printing may be on any of the surfaces of first and/or second polymeric sheets 20, 22, or any of the surfaces of layers 24, 26 making up the sheets 20, 22 as shown in FIG. 9 with respect to the first polymeric sheet 20.

Inks suitable for printing on the first and second polymeric sheets 20, 22 are selected to also be suitable for the respective selected printing technique. Inks that are suitable include, but are not limited to, those including a colorant with functional groups, for example isocyanate or isocyanate-reactive groups. Other suitable inks include those contained in weakly-polar or non-polar solvents or diluents that are useful in printing on polymeric materials such as polyurethanes. Non-limiting examples include alcohol-soluble inks, polyamide inks, dye-containing inks, acrylic inks, and water-based inks. Inks are commercially available in many suitable colors, including, for example, cyan, magenta, yellow, and black for four-color process printing and other process inks.

The particular ink used in printing the images 12A, 12B and/or 12C is selected to achieve adequate image fixation of the ink printed on the first and/or second polymeric sheets 20, 22. For example, an ink may be selected to have properties similar to those of the first and/or second polymeric sheets 20, 22. The first and/or second polymeric sheets 20, 22 may be prepared for printing by being treated, for example, by wiping or washing with an organic solvent or by plasma or corona discharge treatment, prior to printing the images 12A, 12B and/or 12C onto the first and/or second polymeric sheets 20, 22 as desired. This preparative treatment may serve to provide a suitable surface tension for the ink to adhere well to the first and/or second polymeric sheets 20, 22. In various embodiments, the surface tension of the first and/or second polymeric sheets 20, 22 may be a first surface tension, and the colored medium 46 may have a second surface tension that is within 10 percent of the first surface tension. Similar surface tensions of the sheets 20, 22 and the colored medium 46 help prevent cracking of the colored medium 46 as the sheets 20, 22 flex under loading.

The images 12A, 12B and/or 12C are painted or printed onto the first and/or second polymeric sheets 20, 22 using any suitable painting or printing technique or combination of painting and printing techniques. Regardless of the process, the colored medium 46 used has a starting hardness when applied and an end hardness when dried or cured onto the first and/or second polymeric sheets 20, 22. The end hardness of the dried or cured colored medium 46 may be selected to be the same or similar to the hardness of the first and/or second polymeric sheets 20, 22 so that the bending or flexing that occurs during use of the bladder element 10 is optimized without causing interruption of the characteristics of the images 12A, 12B and/or 12C, e.g. cracking. In various embodiments, a hardness of the first polymeric sheet 20 would be a first hardness, and an end hardness of the colored medium 46 would be a second hardness within 25 percent of the first hardness.

The colored medium 46 may also be selected to provide a particular appearance of the images 12A, 12B, and/or 12C. For example, the colored medium 46 may be selected to provide a high intensity appearance of the image 12A, 12B, and/or 12C or, conversely, a faded appearance of the image 12A, 12B, and/or 12C. Additionally, if the colored medium 46 is applied to the first and/or second polymeric sheets 20, 22 prior to forming the sheets 20, 22 into the bladder element 10, the colored medium 46 is selected to ensure that it withstands the temperatures of processing the first and/or second polymeric sheets 20, 22, such as, for example, if thermoforming is used, the temperatures that the first and second polymeric sheets 20, 22 reach during thermoforming of the sheets 20, 22 which may be but is not limited to between 300 and 340 degrees Fahrenheit. This ensures that the images 12A, 12B, and/or 12C will not be unintentionally modified or warped during the formation process. Moreover, the colored medium 46 is selected to prevent migration over time in the first and second polymeric sheets 20, 22, and to maintain a desired level of colorfastness.

In sublimation printing, an ink may be incorporated into the first and/or second polymeric sheets 20, 22, particularly onto a surface layer 24 of the first and/or second polymeric sheet 20, 22. Sublimation inks or dyes include, but are not limited to, acid dyes, vat dyes, disperse dyes, direct and reactive dyes, and the like. Non-limiting examples of the chemical classes of sublimation inks or dyes include azo, anthroquinone, and phthalocyanine dye systems.

Sublimation printing is performed with a printhead, with thermal printers, offset printers, monochrome laser printers, specially made processors, screen printing transfers, and the like. The inks are subjected to sublimation temperature and pressure conditions appropriate for the first and/or second polymeric sheets 20, 22, or the layers 24, 26 of the first and/or second polymeric sheets 20, 22. A particular temperature used depends on the specific material of the first or second polymeric sheet 20 or 22, or layers 24, 26 of the first or second polymeric sheet 20, 22 selected. In various embodiments involving sublimation, preconditioning of the first and/or second polymeric sheets 20, 22 is optionally used prior to applying the sublimation ink. For example, the preconditioning may optionally include heating the first and/or second polymeric sheets 20, 22 to a predetermined temperature so that the first and/or second polymeric sheets 20, 22 are sufficiently receptive to the ink at the sublimation temperature.

In the sublimation printing process, the ink permeates the first and/or second polymeric sheets 20, 22. The ink may interact with the polymer matrix while in the sublimed state. Upon cooling, the ink returns to its solid form, and the desired image is formed on the first and/or second polymeric sheet 20, 22.

Another method of printing that may be used to establish the images 12A, 12B, and/or 12C includes flexographic printing. Flexographic printing uses flexible printing plates made of rubber or plastic. Shapes in the reverse of the images 12A, 12B, and/or 12C are formed on slightly raised portions of the plates. In flexographic rotary printing, the plates are secured to a cylinder. The colored medium 46 is applied to the plates, and the plates are rotated on the cylinder to transfer the images 12A, 12B, 12C to the first and second polymeric sheets 20, 22, respectively. This method of flexographic printing is one type of rotary printing. One method of printing that may be used is direct rotary printing, in which the reverse of the image 12A, 12B, or 12C is formed directly on the cylinder, the colored medium 46 is applied to the cylinder, and the cylinder is rotated to apply a colored medium version of the image 12A, 12B, or 12C to the first or second polymeric sheets 20, 22, respectively.

Another method of printing that may be used is lithographic printing. In direct lithographic printing, a polymeric coating in the reverse (i.e., the mirror image) of the images 12A and/or 12C is applied on one plate, and a polymeric coating in the reverse of the image 12B is applied on another plate. The colored medium 46 is applied to the plates, and the plates are then applied in contact with the first and second polymeric sheets 20, 22, respectively, to create the images 12A, 12B, and 12C, respectively. In indirect lithographic printing, also referred to as offset lithographic printing, a polymeric coating in the shape of the images 12A and/or 12C is applied on one plate, and a polymeric coating in the shape of the image 12B is applied on another plate. The reverse of the images 12A, 12B, 12C is then transferred to a flexible plate such as a plate of rubber or plastic. The flexible plates are then coated with the colored medium 46 and applied in contact with the first and second polymeric sheets 20, 22, respectively, to establish the images 12A, 12B, 12C, respectively on the first and second polymeric sheets 20, 22.

One method of direct printing that may be used is gravure printing. Gravure printing uses a plate or cylinder into the surface of which the reverse of the image 12A, 12B, and/or 12C to be printed is etched, engraved, or stippled. A film of the colored medium 46, such as printing ink, is supplied to the whole printing surface and the surface is then wiped, for example by a doctor blade, in order to remove all of the colored medium 46 from the non-indented parts of the plate or cylinder. The colored medium 46 is only left on the indentations or cells. The first and/or second polymeric sheets 20, 22 are then pressed into contact with the inked surface of the plate or cylinder in order to receive an impression in of the desired image 12A, 12B, or 12C, respectively. Alternatively, indirect gravure printing, i.e., offset gravure printing, can be used. In that instance, the shape of the image 12A, 12B, and/or 12C is etched, engraved, or stippled into the surface of the plate or cylinder. A reverse of the image is then transferred onto a flexible plate. The first and/or second polymeric sheets 20, 22 are then pressed into contact with the inked surface of the flexible plate in order to receive an impression of the desired image 12A, 12B, or 12C, respectively. Pad printing is an indirect offset gravure printing process in which the flexible plate is a transfer pad.

Another method of direct printing that may be used is digital printing. A printer, such as an ink jet or laser jet printer, has a digital-based image, such as an image saved as a computer file, and applies colored medium 46 in the form of ink and/or toner by depositing the medium 46 according to the digital based image onto the first and second polymeric sheets 20, 22, respectively. The colored medium 46 forms a layer on the surface of the first or second polymeric sheet 20, 22, respectively, and may be further secured to the first or second polymeric sheet 20, 22 by heating and/or ultraviolet curing processes.

In another alternative, instead of printing the images 12A, 12B, 12C, the colored medium 46 can be paint, and any or all of the images 12A, 12B, 12C can be directly painted onto the first or second polymeric sheets 20, 22.

In certain embodiments, a protective coating layer 15, shown in FIG. 4, also referred to as a topcoat or barrier, can be placed on and secured to the bladder element 10 over one or more of the images 12A, 12B, 12C to protect the images 12A, 12B, 12C. Exemplary materials for a coating layer include polymers or prepolymers such as polyurethane, polytetrafluorethylene, polypropylene, polycarbonate, and the like, as non-limiting examples. In FIG. 4, the protective coating 15 is over the image 12C.

With reference to FIG. 1, the first polymeric sheet 20 is bonded to the second polymeric sheet 22 to form a peripheral seam 28 around a periphery of the bladder element 10.

Figure 11:
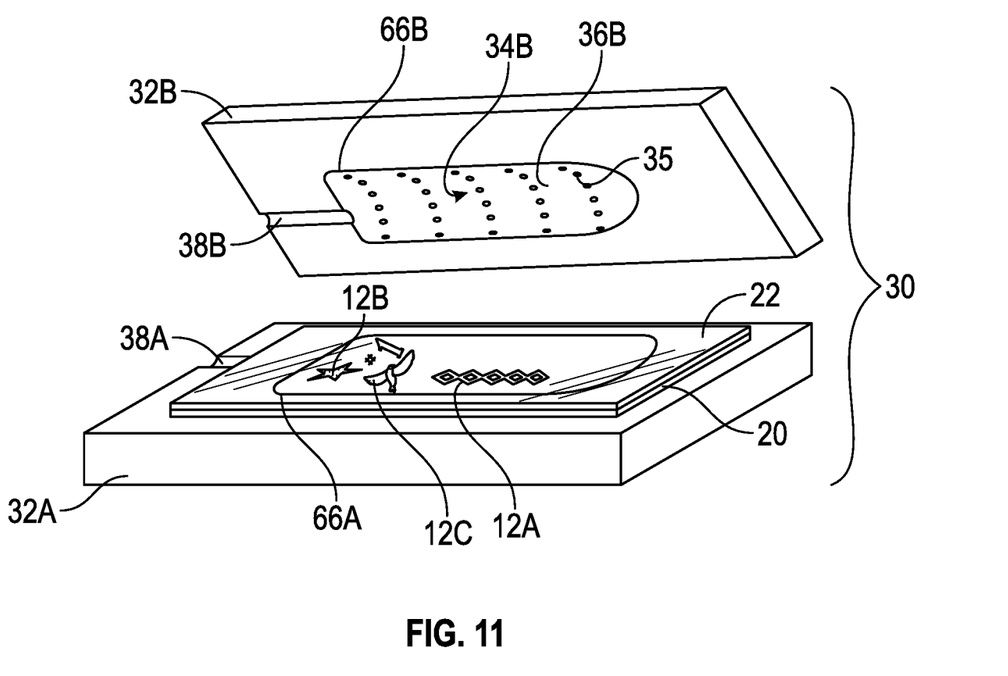
FIG. 11 is a schematic illustration in exploded perspective view of a mold assembly including the mold half of FIG. 10 with first and second polymeric sheets for the bladder element of FIG. 1 positioned thereon.
Figure 12:
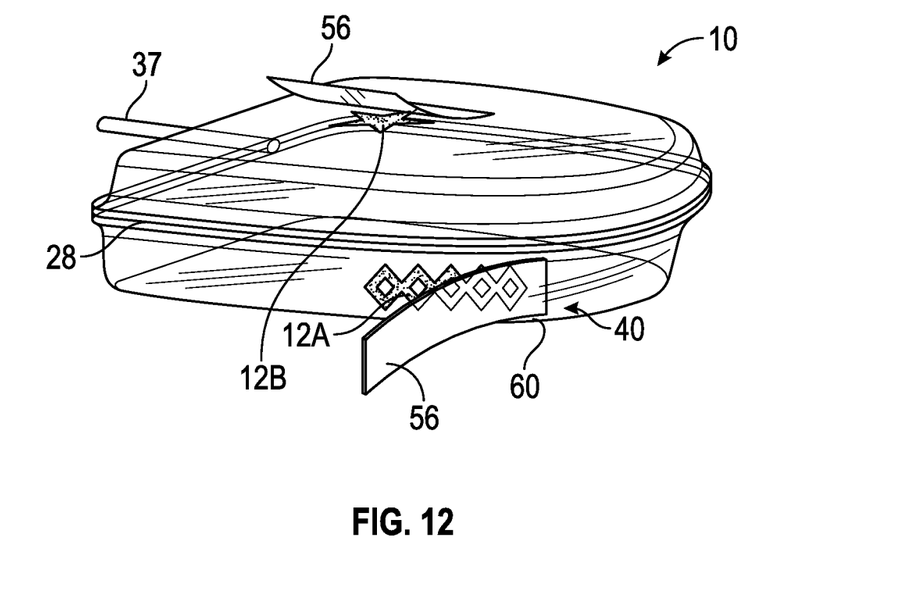
FIG. 12 is a schematic perspective illustration of the bladder element of FIG. 1 showing a fill tube and showing releasable film layers at the images.

The seam 28 seals the internal cavity 23 of the bladder element 10, assuming the fill tube 37 shown and described with respect to FIG. 12 is plugged. The seam 28 may also help the bladder element 10 retain its shape. The first and second polymeric sheets 20, 22 can be bonded to one another by forming in a mold assembly 30 as shown in FIG. 11. The mold assembly 30 includes a first mold half 32A and a second mold half 32B. The first mold half 32A has a mold cavity portion 36A with a mold surface 34A, shown best in FIG. 9. The second mold half 32B has a mold cavity portion 36B with a mold surface 34B.

Optionally, as shown in FIG. 12, a respective releasable film 56 can be attached to the first or second polymeric sheets 20, 22 over the images 12A, 12B, and/or 12C prior to forming the sheets 20, 22 in the mold assembly 30. The releasable film 56 is placed in contact with the mold surface when first and second polymeric sheets 20, 22 are placed in the mold assembly 30. The releasable film 56 may be a material that will not stick to the mold surfaces 34A, 34B to enable the bladder element 10 to be easily released from the mold assembly 30, and also serves to protect the images 12A, 12B, 12C from direct contact with the mold surfaces 34A, 34B. Suitable materials for the releasable film 56 include polymeric films or metal foils having a relatively low surface energy coating such as a silicone, polyolefin, or polybutadiene coating. The releasable film 56 is peeled off and removed from the bladder element 10 after the bladder element 10 is formed.

Referring to FIG. 11, to form the bladder element 10 in the mold assembly 30, the first polymeric sheet 20 is first laid on the first mold half 32A, across the mold cavity portion 36A. The second polymeric sheet 22 is then placed on the first polymeric sheet 20. Both the first and the second polymeric sheets 20, 22 are in their original, generally flat form when initially placed on the mold half 32A. Although FIG. 11 shows the images 12A, 12B, 12C printed or painted on the sheets 20, 22 prior to formation of the bladder element 10, the images 12A, 12B, 12C can also be applied to the sheets 20, 22 only after the sheets 20, 22 are formed into the bladder element 10, and the bladder element 10 is inflated.

After the first and second polymeric sheets 20, 22 are placed in the mold assembly 30, the mold assembly 30 is closed. A forming process is then used to shape the first and second polymeric sheets 20, 22 to the mold halves 32A, 32B, such as by the use of temperature and pressure control. For example, the forming process may include any or all of thermoforming, vacuum forming, compression forming, or radio-frequency welding. Vacuum ports 35 are shown extending through the mold halves 32A, 32B, and a vacuum may be applied through the ports 35 to pull the first and second polymeric sheets 20, 22 against the mold surfaces 34A, 34B in the mold cavity portions 32A, 32B. The first and second polymeric sheets 20, 20 may be heated by the mold assembly 30 during the forming process. Additionally, a fill tube 37, shown in FIG. 12, may be formed by recesses 38A, 38B in the mold halves 32A, 32B that mate when the mold assembly 30 is closed. The portion of the first and second polymeric sheets 20, 22 surrounding the mold cavity portions 36A, are bonded to one another by any or all of thermoforming, radio frequency welding, or compression forming through pressure applied by the mold halves 32A, 32B or by a separate machine after removal from the mold halves 32A, 32B.

After the first and second polymeric sheets 20, 22 are formed to the contours of the mold assembly 30 in the mold cavity portions 36A, 36B and, if heated, sufficiently cooled, the mold halves 32A, 32B are then separated, and excess material of the first and second polymeric sheets 20, 22 around the periphery of the seam 28 is trimmed. The releasable film 56, if used, is then removed from the first and second polymeric sheets 20, 22. FIG. 12 illustrates the releasable film 56 in the process of being peeled off and released from the first and second polymeric sheets 20, 22. The fill tube 37 formed at the recesses 38A, 38B may be used to inflate the bladder element 10 with gas at or above ambient pressure, and then the fill tube 37 may be plugged and trimmed so that the bladder element 10 is in its final, formed state.

Figure 8:
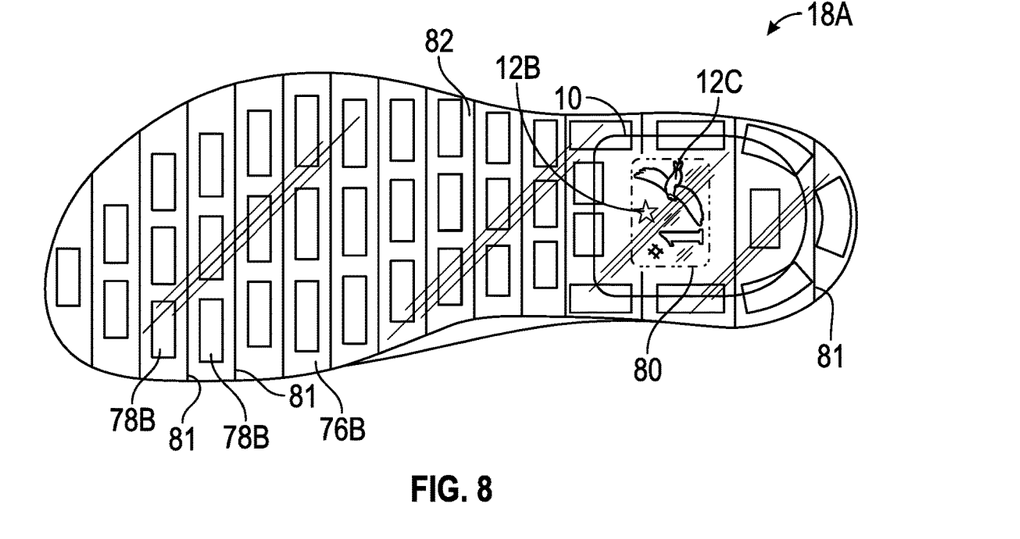
FIG. 8 is a schematic bottom view illustration of the article of footwear of FIG. 5 having an alternative embodiment of an outsole.

As best shown in FIGS. 1, 8 and 11, at least the image 12A is on a curved portion 60 of the outer surface 40 of the bladder element 10. Both the colored medium 46 used for the image 12A, such as ink with reflective particles 48, and the material used for the first and second polymeric sheets 20, 22, are sufficiently flexible to form to the shape of the curved portion 60. Additionally, the images 12A, 12B, 12C are each spaced from the seam 28 on the formed bladder element 10. In an embodiment in which the images 12A, 12B, 12C are applied to the sheets 20, 22 before the sheets 20, 22 are formed into the bladder element, this is due to their initial placement in the mold assembly 30 away from a perimeter 66A, 66B of the mold cavity portions 36A, 36B. The images 12A, 12B, 12C are applied on the first and second polymeric sheets 20, 22 (e.g., by printing or painting) either before the sheets 20, 22 are formed into the bladder element 10 or afterward, so that they are spaced from the seam 28. When the bladder element 10 is formed, the third image 12C is on a bottom surface 53 which is part of the outer surface 40.

With reference to FIG. 4, the bladder element 10 can be secured in the sole assembly 16 such as by bonding to a midsole 70 of the sole assembly 16. For example, the bladder element 10 can be bonded with adhesive to the formed midsole 70. Alternatively, the bladder element 10 can be placed in a midsole mold assembly (not shown), and the midsole 70 may be formed around the bladder element 10, such as by injecting foam into the midsole mold assembly. In still other embodiments, the bladder element 10 is secured to the sole assembly 16 by an interference fit. In all such embodiments, because the images 12A, 12B, 12C are spaced apart from the seam 28, the bladder element 10 can be assembled in the article of footwear 18 so that the images 12A, 12B, 12C are aligned with and exposed to view through openings in the sole assembly 16 and/or in a footwear upper extending over the sole assembly, such as represented by an insole or sockliner 73 as described herein, while the seam 28 can be covered by and block from view by the article of footwear 18. For example, as shown in FIG. 5, the midsole 70 is formed with an opening 72A. The image 12A is positioned at the opening 72A so that it is at the exterior of the article of footwear 18 and exposed to view through the opening 72A, while the peripheral seam 28 is covered by and blocked from view by the article of footwear 18, and more specifically by the midsole 70 (i.e., is not exposed at the opening 72A). Stated differently, a first portion of the bladder element 10 including the image 12A is aligned with the opening 72A and exposed to view through the opening 72A (i.e., such as from a viewpoint of a side view as in FIG. 5). A second portion of the bladder element (i.e., the portion indicated with hidden lines in FIG. 5) is covered by and blocked from view by the midsole 70.

Figure 6:
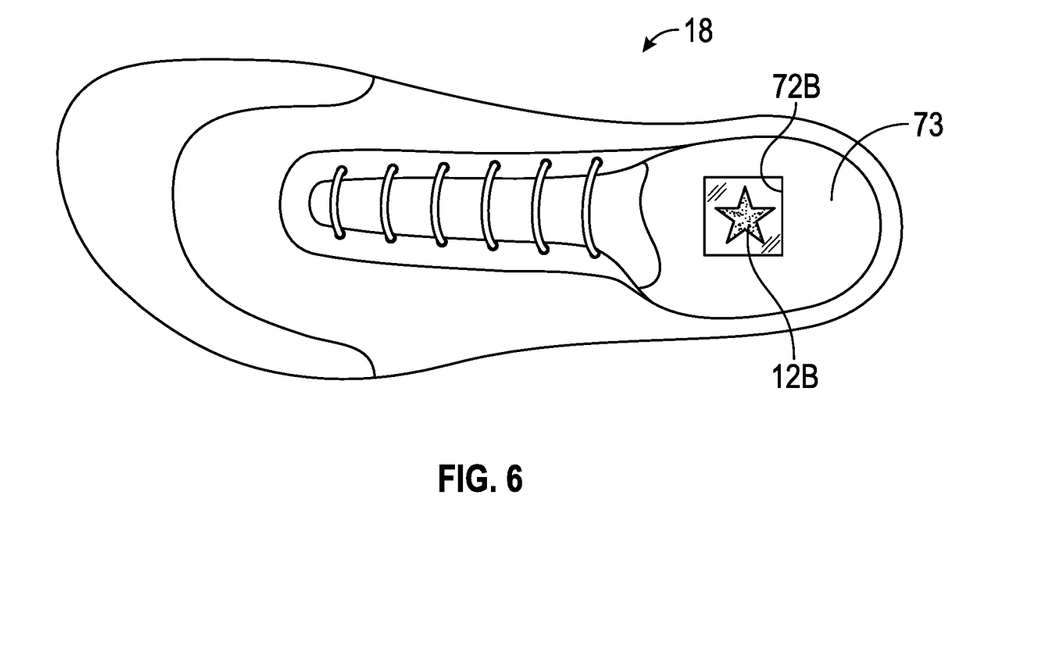
FIG. 6 is a schematic top view illustration of the article of footwear of FIG. 5.

In another example, as shown in FIG. 6, the sockliner 73 also has an opening 72B and the bladder element 10 is secured to the sole assembly 16 so that the sole assembly 16 and the sockliner 73 do not cover the image 12B, and a first portion of the bladder element 10 with the image 12B is exposed to view through the opening 72B, with the image 12B aligned with the opening 72B. A second portion of the bladder element 10, including the peripheral seam 28, is not exposed at the opening 72B, but is covered by and blocked from view at least by the sockliner 73 (i.e., from the viewpoint of FIG. 6).

Figure 7:
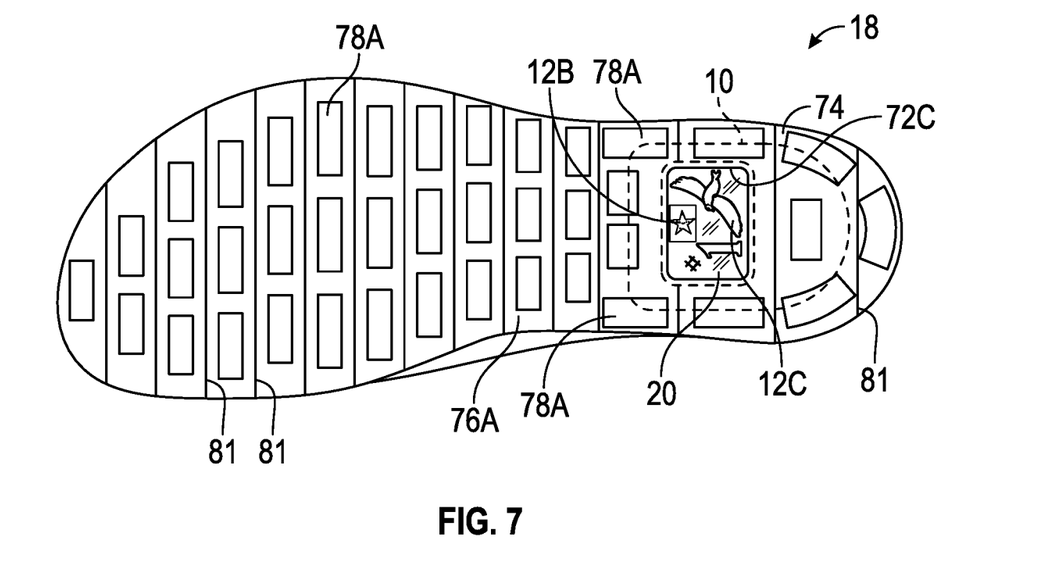
FIG. 7 is a schematic bottom view illustration of the article of footwear of FIG. 5 having a first embodiment of an outsole.

As is apparent in FIG. 7, the sole assembly 16 does not cover at least the image 12C. The sole assembly 16 includes an outsole 76A secured to a lower surface 75 of the midsole 70 as also shown in FIG. 5. In one embodiment, the outsole 76A has an opening 72C that is aligned with the image 12C so that a first portion of the bladder element 10 including the image 12C is exposed to view through the opening 72C at the exterior of the article of footwear 18, and may be viewed from a viewpoint looking at a bottom of the footwear 18, such as when a wearer of the article of footwear 18 lifts a heel portion 74 of the article of footwear 18. Accordingly, the bladder element 10 forms a portion of the exterior of the article of footwear 18 at the opening 72C in the outsole 76A. A second portion of the bladder element 10, represented by hidden lines in FIG. 7, is covered by the outsole 76A and blocked from view by the outsole 76A.

The outsole 76A is shown with tread elements 78A having bottom surfaces that form a ground contact surface of the article of footwear 18. The tread elements 78A can have various alternative shapes and can be arranged in various alternative arrangements. The outsole 76A shows grooves 81 formed in the outsole 76A.

FIG. 8 shows an alternative embodiment of an outsole 76B secured to the midsole 70 of FIG. 5 and to the bladder element 10. The outsole 76B has at least a portion 80, bounded by phantom lines, that is substantially transparent. The substantially transparent portion 80 is aligned with the image 12C so that the image 12C is exposed to view at an exterior of an article of footwear 18A, and may be viewed through the portion 80 of the outsole 76B that is substantially transparent, such as when a wearer lifts the heel portion 74 of the article of footwear 18A. A remaining portion 82 of the outsole 76B, not bounded by the phantom lines, can also be substantially transparent. In the embodiment shown, the entire outsole 76B is substantially transparent. Alternatively, the remaining portion 82 could be opaque or not substantially transparent. The outsole 76B shows grooves 81 formed in the outsole 76B and a different arrangement of tread elements 78B. The article of footwear 18A has a different outsole 76B than the article of footwear 18, but is otherwise the same as the article of footwear 18.

Figure 13:
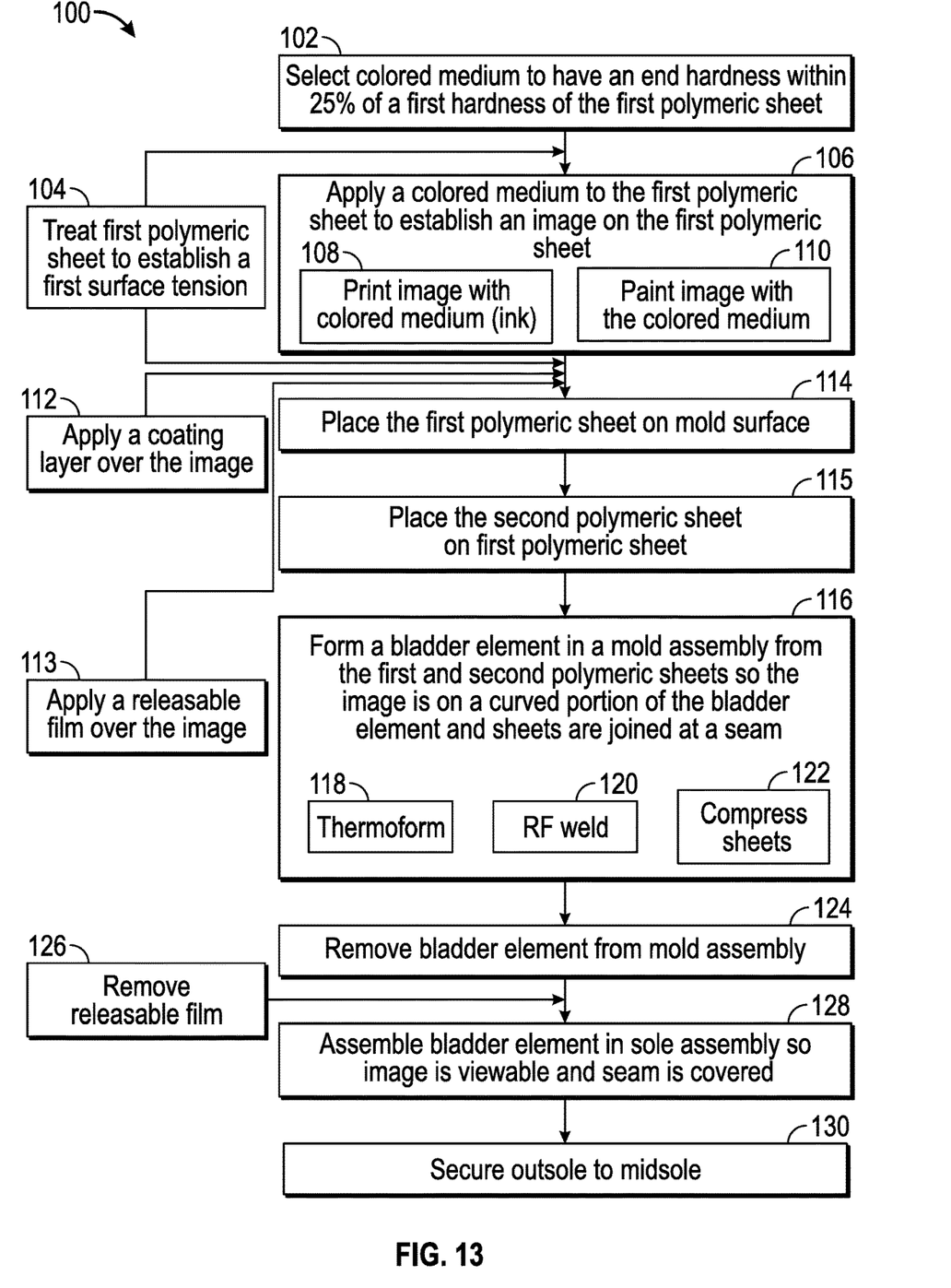
FIG. 13 is a flow diagram illustrating a method of manufacturing an article such as the article of footwear of FIG. 5.

Referring to FIG. 13, a method 100 of manufacturing an article, such as the article of footwear 18, may begin with step 102, selecting a colored medium 46, optionally so that it has an end hardness within 25 percent of a first hardness of the first polymeric sheet 20. Additionally, the method 100 may include optional step 104, treating the first polymeric sheet 20 to establish a first surface tension. The first surface tension may be selected to be within 10 percent of a second surface tension of the colored medium 46.

In step 106, the colored medium 46 is applied to the first polymeric sheet 20 to establish an image 12A on the first polymeric sheet 20. In one embodiment, step 106 occurs prior to steps 112, 124. In another embodiment, step 106 occurs after step 124 (i.e., after the bladder element 10 is formed and removed from the mold assembly 30 and, optionally, after the bladder element 10 is inflated). In step 106, the image 12A is applied so that it will be exposed to view from an exterior of the fluid-filled bladder element 10 when the first polymeric sheet 20 is used to at least partially form the bladder element 10. In step 106, additional images 12B and/or 12C may also be established on the first or second polymeric sheets 20, 22. For purposes of discussion, the method 100 is discussed with respect to image 12A. Alternatively, the first and second polymeric sheets 20, 22 may be obtained with the images 12A and 12B already applied thereon, in which case step 106 is not performed.

Step 106 may include sub-step 108, printing the image 12A with the colored medium 46, such as colored ink. As previously discussed, the ink may be a colorant with functional groups, for example isocyanate or isocyanate-reactive groups, or an ink contained in weakly-polar or non-polar solvents or diluents that are useful in printing on polymeric materials such as polyurethanes, including alcohol-soluble inks, polyamide inks, dye-containing inks, acrylic inks, and water-based inks. Printing under sub-step 108 may be by any of the techniques discussed herein, including sublimation printing, flexographic printing, direct rotary printing, lithographic printing, gravure printing, pad printing, or digital printing. Step 106 may include sub-step 110, painting the image 12A with the colored medium 46 as an alternative to or in addition to sub-step 108.

In optional step 112, a coating layer 15 is applied over one or more of the images 12A, 12B, 12C. More specifically, the coating layer 15 is placed on the first or second polymeric sheets 20, 22 over one or more of the images 12A, 12B, 12C to protect the images 12A, 12B, 12C. FIG. 4 shows the coating layer 15 over images 12B and 12C. Exemplary materials for a coating layer include polymers or prepolymers such as polyurethane, polytetrafluorethylene, polypropylene, polycarbonate, and the like, as non-limiting examples. The coating layer 15 may be placed over the images 12A, 12B, and/or 12C before the sheets 20, 22 are formed into the bladder element 10, or after the bladder element 10 is formed.

In optional step 113, a releasable film 56 can be placed over one or more of the images 12A, 12B, 12C to protect the images 12A, 12B, and/or 12C, such as to protect the images 12A, 12B, 12C from direct contact with the mold assembly 30 during formation of the bladder element 10. FIG. 12 shows releasable films 56 that had previously been placed over the images 12A, 12B in the process of being removed.

In step 114, the first polymeric sheet 20 is placed on the first mold surface 34A, and in step 115, the second polymeric sheet 22 is placed on the first polymeric sheet 20. The first polymeric sheet 20 is positioned in the mold assembly 30 so that the first image 12A will be on the curved portion 60 of the bladder element 10 corresponding to a curved portion 55 of the mold surface 34A when the bladder element 10 is formed. If any releasable film 56 is on the first polymeric sheet 20 covering the image 12A, the releasable film 56 is in contact with the mold surface 34A.

The method 100 also includes forming the bladder element 10 in the mold assembly 30 in step 116. Forming the bladder element 10 may be by thermoforming, vacuum forming, or both in sub-step 118. Forming the bladder element 10 in step 116 is accomplished so that the first and second polymeric sheets 20, 22 are bonded at a seam 28, and the image 12A is on a curved portion 60 of the bladder element 10 spaced from the seam 28 (or will be on the curved portion 60 if applied after the bladder element 10 is formed and inflated). The first polymeric sheet 20 and the second polymeric sheet 22 together define the internal cavity sealed by the peripheral seam 28, and the image 12A is spaced from the peripheral seam 28. Images 12B and 12C are also spaced from the seam 28.

Forming the bladder element 10 in step 116 may include sub-step 120, bonding the first and second polymeric sheets 20, 22 to one another by radio frequency welding the first polymeric sheet 20 to the second polymeric sheet 22 at the peripheral seam 28. Alternatively or in addition, if forming of the bladder element 10 is by thermoforming, bonding the sheets 20, 22 to one another may include compressing the first polymeric sheet 20 to the second polymeric sheet 22 at the peripheral seam 28 in sub-step 122.

After any cooling period, the mold assembly 30 is opened, and the bladder element 10 is removed from the mold assembly 30 in step 124. If any releasable film 56 is on any of the images 12A, 12B, and/or 12C, the releasable film 56 is removed from the images 12A, 12B, and/or 12C in step 126, as shown in FIG. 12. In one embodiment, step 106 is performed after step 124, and after inflating and sealing the bladder element 10. The bladder element 10 with the images 12A, 12B, 12C is now complete.

Optionally, if the same entity carrying out steps 102-126 also assembles the bladder element 10 in an article such as the article of footwear 18, then the method 100 can proceed with steps 128 and 130. In step 128, the fluid-filled bladder element 10 is assembled in the sole assembly 16 of the article of footwear 18 by securing the bladder element 10 to the midsole 70. In various embodiments, securing the bladder element 10 to the midsole 70 can be accomplished with adhesive or by forming the midsole 70 around the bladder element 10 in a midsole mold assembly (not shown). In all of these embodiments, the bladder element 10 may be assembled in the article of footwear 18 so that the peripheral seam 28 and the second portion of the bladder element 10 are covered by and blocked from view by the article of footwear 18, and the image 12A as well as image 12B, if included, are exposed at openings such as opening 72A in the midsole 70 and opening 72B in the sockliner 73, as described with respect to the embodiment of FIGS. 4 and 5. In other words, the image 12A is aligned with the opening 72A so that the image 12A is exposed to view and can be viewed through the opening 72A from an exterior of the article of footwear 18. Similarly, the image 12B is aligned with the opening 72B so that the image 12B is exposed to view and can be viewed through the opening 72B from an exterior of the article of footwear 18.

Next, in step 130, an outsole can be secured to the midsole 70. If outsole 76A of FIG. 7 is used, the opening 72C is aligned with the image 12C. If outsole 76B of FIG. 8 is used, the substantially transparent portion 80 of the outsole 76B is aligned with the image 12C so that the image 12C is exposed to view through the substantially transparent portion 80 of the outsole 76B. As discussed above, the entire outsole 76B may be substantially transparent.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. A method for manufacturing an article of footwear having a sole assembly with an outsole, the method comprising:
   applying a colored medium on a first polymeric sheet that establishes an image on the first polymeric sheet; wherein the colored medium comprises ink, and said applying the colored medium comprises printing the colored medium on an outer surface of the first polymeric sheet;
   forming a fluid-filled bladder element at least partially from the first polymeric sheet with the outer surface of the first polymeric sheet being an outer surface of the fluid-filled bladder element so that the image is on the outer surface of the fluid-filled bladder element;
   wherein said forming the fluid-filled bladder element comprises bonding the first polymeric sheet to a second polymeric sheet at a peripheral seam so that the first polymeric sheet and the second polymeric sheet together define an internal cavity sealed at the peripheral seam and filled with gas at or above ambient pressure; and
   assembling the fluid-filled bladder element in the article of footwear, said assembling including aligning the image with an opening in a bottom surface of the outsole so that the outer surface of the first polymeric sheet with the image thereon is exposed to view through the opening in the outsole and forms a portion of an exterior of the article of footwear at the opening in the outsole, and a portion of the fluid-filled bladder element is blocked from view by the outsole.

2. The method of claim 1, wherein:
   said assembling includes securing the fluid-filled bladder element to the sole assembly.

3. The method of claim 1,
   wherein said assembling the fluid-filled bladder element in the article of footwear includes covering the peripheral seam with the sole assembly so that the peripheral seam is blocked from view by the sole assembly.

4. The method of claim 3, wherein:
   said forming comprises thermoforming; and
   said bonding comprises compressing the first polymeric sheet to the second polymeric sheet at the peripheral seam during said thermoforming.

5. The method of claim 3, wherein said bonding comprises radio frequency welding the first polymeric sheet to the second polymeric sheet at the peripheral seam.

6. The method of claim 1, wherein:
   said forming the fluid-filled bladder element includes forming the first polymeric sheet with a curved portion; and
   the image is on the curved portion.

7. The method of claim 1, wherein the ink comprises at least one of an isocyanate group, an isocyanate-reactive group, a non-polar solvent, a non-polar diluent, an alcohol-soluble ink, a polyamide ink, a dye-containing ink, an acrylic ink, or a water-based ink.

8. The method of claim 1, wherein said printing comprises pad printing, sublimation printing, flexographic printing, direct rotary printing, lithographic printing, gravure printing, or digital printing.

9. The method of claim 1, further comprising:
   treating the first polymeric sheet thereby establishing a first surface tension of the first polymeric sheet; and
   wherein the colored medium has a second surface tension within 10 percent of the first surface tension.

10. The method of claim 1, wherein the first polymeric sheet comprises a thermoplastic polyurethane.

11. The method of claim 10, wherein the first polymeric sheet comprises a multi-layer polymeric sheet.

12. The method of claim 11, wherein the multi-layer polymeric sheet is a laminate membrane having: at least a first layer comprising the thermoplastic polyurethane; and at least a second layer comprising a gas barrier polymer.

13. The method of claim 12, wherein the gas barrier polymer is an ethylene-vinyl alcohol copolymer.

14. The method of claim 13, wherein the at least a first layer consists essentially of the thermoplastic polyurethane, and the at least a second layer consists essentially of the ethylene-vinyl alcohol copolymer.

15. The method of claim 1, wherein the colored medium includes reflective particles.

16. The method of claim 1, further comprising:
selecting the colored medium so that, after forming the fluid-filled bladder element, a hardness of the colored medium is within 25 percent of a hardness of the first polymeric sheet.

17. The method of claim 1, further comprising:
prior to said forming the fluid-filled bladder element, attaching a releasable film to the first polymeric sheet over the image;
placing the first polymeric sheet in a mold assembly with the releasable film in contact with a mold surface of the mold assembly; and
removing the releasable film from the first polymeric sheet after the fluid-filled bladder element is formed.

18. The method of claim 1, wherein the sole assembly further comprises a midsole, and the outsole is secured to a lower surface of the midsole.

19. The method of claim 18, wherein the sole assembly further comprises an insole, and the midsole is disposed between the insole and outsole.

* * * * *